US007552093B2

(12) United States Patent
Levin et al.

(10) Patent No.: US 7,552,093 B2
(45) Date of Patent: Jun. 23, 2009

(54) RESOLVING LICENSE DEPENDENCIES FOR AGGREGATIONS OF LEGALLY-PROTECTABLE CONTENT

(75) Inventors: Douglas Andrew Levin, Boston, MA (US); Palle Martin Pedersen, Brookline, MA (US); Ashesh C. Shah, Brookline, MA (US)

(73) Assignee: Black Duck Software, Inc., Waltham, MA (US)

( * ) Notice: Subject to any disclaimer, the term of this patent is extended or adjusted under 35 U.S.C. 154(b) by 868 days.

(21) Appl. No.: 10/728,174

(22) Filed: Dec. 4, 2003

(65) Prior Publication Data
US 2005/0125359 A1    Jun. 9, 2005

(51) Int. Cl.
*H04K 1/00* (2006.01)
*H04L 9/00* (2006.01)
(52) U.S. Cl. .............................. 705/59; 705/51; 705/54
(58) Field of Classification Search ............. 705/51–53, 705/59
See application file for complete search history.

(56) References Cited

U.S. PATENT DOCUMENTS

| | | | |
|---|---|---|---|
| 5,313,616 A | 5/1994 | Cline et al. ............... 395/500 |
| 5,343,527 A | 8/1994 | Moore | |
| 5,469,354 A | 11/1995 | Hatakeyama et al. | |
| 5,577,249 A | 11/1996 | Califano | |
| 5,765,152 A * | 6/1998 | Erickson ...................... 707/9 |
| 5,774,883 A | 6/1998 | Andersen et al. ............ 205/38 |
| 5,796,830 A | 8/1998 | Johnson et al. | |
| 5,892,900 A * | 4/1999 | Ginter et al. ............... 726/26 |
| 5,893,095 A | 4/1999 | Jain et al. | |
| 5,917,912 A | 6/1999 | Ginter et al. ............... 380/24 |
| 5,958,051 A | 9/1999 | Renaud et al. ............. 713/200 |
| 6,029,002 A | 2/2000 | Afifi et al. | |
| 6,035,402 A | 3/2000 | Vaeth et al. ............... 713/201 |
| 6,072,493 A | 6/2000 | Driskell et al. ............ 345/356 |
| 6,148,401 A | 11/2000 | Devanbu et al. | |
| 6,188,995 B1 | 2/2001 | Garst et al. | |

(Continued)

FOREIGN PATENT DOCUMENTS

WO    WO-02/27486    4/2002

OTHER PUBLICATIONS

"TeleKnowledge" M2 Presswire. Coventry: Jul. 1, 2002. p. 1.*

(Continued)

*Primary Examiner*—Calvin Loyd Hewitt, II
*Assistant Examiner*—Mohammad Nilforoush
(74) *Attorney, Agent, or Firm*—Goodwin Procter LLP

(57) ABSTRACT

The disclosed technology can be used to develop systems and perform methods in which restriction, use, and/or interaction values can be assigned to license attributes associated with a first license to specify particular restrictions, uses (e.g., distribution), and interactions (e.g., manipulations) pertaining to a first protectable content. These restriction, use, and/or interaction values can be compared with corresponding attribute values associated with a second license and a second protectable content and such comparisons can serve as a basis for determining attributes associated with a third protectable content, where the third protectable content is based on a combination of at least some aspects of the first protectable content and the second protectable content. The first and/or second protectable content can correspond to one or more multimedia presentations, video segments, audio segments, textual representations, works of art, visual representations, technological know-how, business know-how, contract rights, and/or software elements.

28 Claims, 2 Drawing Sheets

U.S. PATENT DOCUMENTS

| | | | |
|---|---|---|---|
| 6,189,146 B1 | 2/2001 | Misra et al. | 717/11 |
| 6,226,618 B1 | 5/2001 | Downs et al. | |
| 6,240,409 B1 | 5/2001 | Aiken | |
| 6,249,769 B1 | 6/2001 | Ruffin et al. | 705/7 |
| 6,260,141 B1 | 7/2001 | Park | 713/155 |
| 6,263,348 B1 | 7/2001 | Kathrow et al. | |
| 6,275,223 B1 | 8/2001 | Hughes et al. | |
| 6,282,698 B1 | 8/2001 | Baker et al. | |
| 6,330,670 B1 | 12/2001 | England et al. | 713/2 |
| 6,381,698 B1 | 4/2002 | Devanbu et al. | |
| 6,393,438 B1 | 5/2002 | Kathrow et al. | |
| 6,397,205 B1 | 5/2002 | Juola | |
| 6,480,834 B1 | 11/2002 | Engle et al. | |
| 6,480,959 B1 | 11/2002 | Granger et al. | 713/189 |
| 6,493,709 B1 | 12/2002 | Aiken | |
| 6,499,035 B1 | 12/2002 | Sobeski | |
| 6,546,114 B1 | 4/2003 | Venkatesan et al. | 382/100 |
| 6,557,105 B1 * | 4/2003 | Tardo et al. | 713/193 |
| 6,574,348 B1 | 6/2003 | Venkatesan et al. | 382/100 |
| 6,658,626 B1 | 12/2003 | Aiken | |
| 6,862,696 B1 | 3/2005 | Voas et al. | |
| 6,931,532 B1 | 8/2005 | Davis et al. | |
| 6,941,459 B1 | 9/2005 | Hind et al. | |
| 6,954,747 B1 | 10/2005 | Wang et al. | |
| 6,961,849 B1 | 11/2005 | Davis et al. | |
| 6,976,170 B1 | 12/2005 | Kelly | |
| 6,978,367 B1 | 12/2005 | Hind et al. | |
| 6,981,023 B1 | 12/2005 | Hamilton et al. | |
| 6,983,371 B1 | 1/2006 | Hurtado et al. | |
| 7,197,156 B1 | 3/2007 | Levy | |
| 7,254,587 B2 | 8/2007 | Lee et al. | |
| 7,305,701 B2 | 12/2007 | Brezak et al. | |
| 2002/0065781 A1 | 5/2002 | Hillegass et al. | 705/59 |
| 2002/0138441 A1 | 9/2002 | Lopatic | 705/59 |
| 2002/0138477 A1 | 9/2002 | Keiser | |
| 2002/0138764 A1 | 9/2002 | Jacobs et al. | 713/201 |
| 2002/0162030 A1 | 10/2002 | Brezak et al. | |
| 2002/0188608 A1 | 12/2002 | Nelson et al. | 707/10 |
| 2002/0194010 A1 | 12/2002 | Bergler et al. | 705/1 |
| 2003/0018891 A1 | 1/2003 | Hall et al. | |
| 2003/0074163 A1 | 4/2003 | Anand et al. | |
| 2003/0079174 A1 | 4/2003 | Hooks | |
| 2003/0125975 A1 | 7/2003 | Danz et al. | |
| 2003/0126456 A1 | 7/2003 | Birzer et al. | 713/193 |
| 2003/0159055 A1 | 8/2003 | Robbins et al. | |
| 2003/0163684 A1 | 8/2003 | Fransdonk | |
| 2003/0167236 A1 | 9/2003 | Stefik et al. | 705/51 |
| 2003/0172035 A1 | 9/2003 | Cronce et al. | 705/59 |
| 2004/0068734 A1 | 4/2004 | Bond et al. | |
| 2004/0073789 A1 | 4/2004 | Powers | |
| 2004/0162827 A1 | 8/2004 | Nakano | |
| 2005/0015343 A1 | 1/2005 | Nagai et al. | |
| 2005/0039034 A1 | 2/2005 | Doyle et al. | |
| 2005/0060643 A1 | 3/2005 | Glass et al. | |
| 2005/0065930 A1 | 3/2005 | Swaminathan et al. | |
| 2005/0114840 A1 | 5/2005 | Zeidman | |
| 2005/0125358 A1 | 6/2005 | Levin et al. | |
| 2005/0125359 A1 | 6/2005 | Levin et al. | |
| 2005/0166094 A1 | 7/2005 | Blackwell et al. | |
| 2005/0216898 A1 | 9/2005 | Powell, Jr. et al. | |
| 2005/0235342 A1 | 10/2005 | Ene-Pietrosanu et al. | |
| 2006/0015465 A1 | 1/2006 | Kume et al. | |
| 2006/0031364 A1 | 2/2006 | Hamilton et al. | |
| 2006/0031686 A1 | 2/2006 | Atallah et al. | |
| 2006/0107070 A1 | 5/2006 | Rice et al. | |
| 2006/0122983 A1 | 6/2006 | King et al. | |
| 2006/0155975 A1 | 7/2006 | Mueller | |
| 2006/0195540 A1 | 8/2006 | Hamilton et al. | |
| 2007/0157311 A1 | 7/2007 | Meier et al. | |
| 2007/0162890 A1 | 7/2007 | Meier et al. | |
| 2007/0299825 A1 | 12/2007 | Rush et al. | |
| 2008/0215897 A1 | 9/2008 | Doyle et al. | |
| 2008/0304669 A1 | 12/2008 | Bugbee | |

OTHER PUBLICATIONS

GPL Compliance Toolset, http://www.metrowerks.com/MW/Develop/Embedded/Linux/GPLCT.htm, printed on Nov. 25, 2003, pp. 1-2.

ZDNet UK- News- Motorola picks Lineo for set-top box, http://news.zdnet.co.uk/hardware/emergingtech/0.39020357.2093969.00.htm, printed on Nov. 26, 2003, pp. 1-3.

Linco launches 'anti-FUD' campaign with license ID tool, http://www.linuxdevices.com/news/NS6538038187.html, printed on Nov. 26, 2003, pp. 1-4.

Linux DevCenter: Lineo's GPL Compliance Tool [Oct. 4, 2001], http://www.oreillynet.com/pub/a/linux/2001/10/04/lineo.html, printed on Nov. 26, 2003, pp. 1-4.

LIDESC: Librock License Awareness System, http://www.mibsoftware.com/librock/lidesc, printed on Nov. 26, 2003, pp. 1-2.

Creating a LIDESC_TAGS string, http://www.mibsoftware.com/librock/lidesc/tags.htm, printed on Nov. 26, 2003, pp. 1-9.

NewsForge/ New utility helps prevent software license violations, http://www.newsforge.com/software/02/04/23/163211.shtml?tid=51, printed on Nov. 26, 2003, pp. 1-3.

New utility helps prevent software license violations [NewsForge], http://www.linuxdevices.com/news/NS3340825769.html, printed on Nov. 26, 2003, pp. 1-3.

[fsl-discuss] Automatic reporting of license terms, http://lists.alt.org/pipermail/fsl-discuss/2002-April/000309.html, printed on Nov. 26, 2003, pp. 1-2.

[fsl-discuss] Automatic reporting of license terms, http://lists.alt.org/pipermail/fsl-discuss/2002-April/000312.html, printed on Nov. 26, 2003, pp. 1-3.

Query FTP Software License Database, http://www.uth.tmc.edu/iaims/network/ftp.html, printed on Nov. 26, 2003, p. 1.

TapTopFolder, http://www.systemconsulting.co.uk/index.php?page=software/products.html, printed on Nov. 26, 2003, p. 1.

TapTopFolder, http://www.systemconsulting.co.uk/index.php?page=software/products/writeme.html, printed on Nov. 26, 2003, p. 1.

TapTopFolder, http://www.systemconsulting.co.uk/index.php?page=software/products/licensedb.html, printed on Nov. 26, 2003, p. 1.

ASAP Software, A Buhrmann Company, 1999-2002 ASAP Software, pp. 1-2.

http://www.mibsoftware.com/librock/lidesc, printed Jul. 18, 2003, pp. 1-23.

Article: How Copyleft Uses License Rights to Succeed in the Open Source Software Revolution and the Implication for Article 2B, HCUL.doc, Oct. 2, 2003, pp. 179-194.

Various Licenses and Comments about Them- GNU Project- Free Software Foundation (FSF), http://www.fsf.org/licenses/license-list.html, printed Nov. 26, 2003, pp. 1-15.

Cleanscape lint jump page, http://www.cleanscape.net/products/lintonline/login.html, printed on Nov. 26, 2003, p. 1.

Code Analysis Settings, http://www.ascensionlabs.com/pbca_CodeAnalysisSettings.htm, printed on Nov. 26, 2003, p. 1.

PB Code Analyzer, http://www.ascensionlabs.com/pbcodeanalyzer.htm, printed on Nov. 26, 2003, pp. 1-5.

Microsoft Software Asset Management: Microsoft Software Inventory Analyzer, http://www.microsoft.com/resources/sam/msia.mspx, printed on Nov. 26, 2003, p. 1.

Fougner, Network Working Group Request for Comments: 1170, "Public Key Standards and Licenses", http://ftp.rfc-editor.org/in-notes/rfc1170.txt, printed on Nov. 26, 2003, pp. 1-2.

Huitema, Network Working Group Request for Comments: 1383, "An Experiment in DNS Based IP Routing", http://ftp.rfc-editor.org/in-notes/rfc1383.txt, printed on Nov. 26, 2003, pp. 1-14.

Eastlake et al, Network Working Group Request for Comments: 3174, "US Secure Hash Algorithm 1 (SHA1)", http://ftp.rfc-editor.org/in-notes/rfc3174.txt, printed on Nov. 26, 2003, pp. 1-21.

Arsenault et al., Network Working Group Request for Comments: 3157, "Securely Available Credentials- Requirements", http://ftp.rfc-editor.org/in-notes/rfc3157.txt, printed on Nov. 26, 2003, pp. 1-19.

Rescorla et al., Network Working Group Request for Comments: 2660, "The Secure HyperText Transfer Protocol", http://ftp.rfc-editor.org/in-notes/rfc2660.txt, printed on Nov. 26, 2003, pp. 1-43.

Pethia et al., Network Working Group Request for Comments: 1281, "Guidelines for the Secure Operation of the Internet", http://ftp.rfc-editor.org/in-notes/rfc1281.txt, printed on Nov. 26, 2003, pp. 1-10.

Rivest, Network Working Group Request for Comments: 1321, "The MD5 Message-Digest Algorithm", http://ftp.rfc-editor.org/in-notes/rfc1321.txt, printed on Nov. 26, 2003, pp. 1-2.

Open Source Initiative OSI- The Open Source Definition, http://www.opensource.org/docs/definition.php, printed on Nov. 26, 2003, pp. 1-4.

Open Source Initiative OSI- Certification Mark and Process, http://www.opensource.org/docs/definition_mark.php, printed on Nov. 26, 2003, pp. 1-5.

Open Source Initiative OSI- Licensing, http://www.opensource.org/licenses/index.php, printed on Nov. 26, 2003, pp. 1-2.

Open Source Initiative OSI- The Attribution Assurance License: Licensing, http://www.opensource.org/licenses/attribution.php, printed on Nov. 26, 2003, pp. 1-3.

A System for Detecting Software Plagiarism, http://cs.berkeley.edu/~aiken/moss.html, Nov. 4, 2005.

Clough, "Plagiarsm in natural and programming languages: an overview of current tools and technologies", http://www1.compaq.com/pressrelease/0,1494,wp%7E14583_2!ob%7E29892_1_1.00.html, pp. 1-31, Jun. 2000.

Cohen, "Recursive Hashing Functions for n-Grams", *ACM Transactions on Information Systems*, 15(3):291-320 (1997).

Damashek, "Gauging Similarity with n-Grams: Language-Independent Categorization of Text", *Science*, New Series, 267(5199):843-848 (1995).

Heckel et al., "A Technique for Isolating Differences Between Files", *Communications of the ACM*, 21(4):264-268 (Apr. 1978).

Johnson, "Identifying Redundancy in Source Code using Fingerprints", pp. 171-183.

Prechelt et al., "Finding plagiarisms among a set of programs with JPlag", Resubmission to J. of Universal Computer Science, Nov. 28, 2001, http://www.jucs.org/.

Schleimer et al., "Winnowing: Local Algorithms for Document Fingerprinting", pp. 76-85.

Si et al., "Check: A Document Plagiarism Detection System", pp. 70-77.

Verco et al., "Plagiarism á la Mode: A Comparison of Automated Systems for Detecting Suspected Plagiarism", *The Computer Journal*, 39(9):741-750 (1996).

Whale, "Identification of Program Similarity in Large Populations", *The Computer Journal*, 33(2):140-146 (1990).

Wise et al., "YAP3: Improved Detection of Similarities in Computer Program and Other Texts", pp. 130-134.

Examination Report for European Application No. 06737533.7, mailed Aug. 28, 2008, 6 pages.

Cole et al. "Verifying Candidate Matches in Sparse and Wildcard Matching" [online]. Montreal, Quebec, Canada, STOC 02, May 19, 2002-May 21, 2002 [retrieved Oct. 30, 2007]. Retrieved from the Internet: <www.citeseer.org>, 10 pages.

International Search Report for related PCT Application No. PCT/US2007/011022, mailed Nov. 12, 2007, 4 pages.

Kamps et al. "Best Match Querying form DocumentCentric XML" [online]. Seventh International Workshop on the Web and Databases, Amsterdam, Netherlands, (WEBDB 2004), Jun. 17, 2004-Jun. 18, 2004 [retrieved on Oct. 30, 2007]. Retrieved from the Internet: <http://staff.science.uva.nl/{mdr/Publications/Files/webdb2004.pdf>, pp. 55-60.

Meziane et al. "A Document Management Methodology Based on Similarity Contents." Elsevier, 2003, Salford, United Kingdom, Information Sciences vol. 158 (2004), pp. 15-36.

Office Action issued in related U.S. Appl. No. 10/728,173, mailed Jan. 28, 2008, 6 pages.

Office Action issued in related U.S. Appl. No. 11/084,063, mailed Sep. 21, 2008, 15 pages.

Written Opinion for related PCT Application No. PCT/US2004/040453, mailed Jun. 4, 2006, 6 pages.

Written Opinion for related PCT Application No. PCT/US2006/008369, mailed Sep. 18, 2007, 4 pages.

Written Opinion for related PCT Application No. PCT/US2007/011022, mailed Nov. 12, 2007, 8 pages.

Examination Report for related European Application No. 06737533.7, mailed Jan. 15, 2008, 2 pages.

Office Action issued in related U.S. Appl. No. 10/084,063, mailed May 1, 2008, 15 pages.

Farringdon, Jill M., *Introduction to Analysing for Authorship: A Guide to the Cusum Technique*, Retrieved from Website: <http://members.aol.com/qsums/>, Introduction link, web pages dated Oct. 13, 2004, Retrieved via The Wayback Machine: <www.archive.org>, 11 pages.

Invitation Pursuant to Article 94(3) and Rule 71(1) EPC for European Patent Application No. 06737533.7 dated Jun. 2, 2008, 2 pages.

Office Action issued in related U.S. Appl. No. 11/429,928 mailed Jun. 27, 2008, 14 pages.

Office Action issued in related U.S. Appl. No. 11/580,220, mailed Jul. 9, 2008, 9 pages.

Final Office Action issued in related U.S. Appl. No. 11/084,063, mailed Nov. 17, 2008, 16 pages.

International Search Report for PCT Application No. PCT/US2007/000272, mailed Nov. 19, 2008, 2 pages.

Written Opinion for PCT Application No. PCT/US2007/000272, mailed Nov. 19, 2008, 5 pages.

Final Office Action issued in related U.S. Appl. No. 10/728,173, mailed Jan. 23, 2009, 11 pages.

Office Action issued in related U.S. Appl. No. 11/429,928 mailed Jan. 27, 2008, 12 pages.

Written Opinion for PCT Application No. PCT/US2007/021648, mailed Jan. 30, 2009, 5 pages.

International Search Report for PCT Application No. PCT/US2007/021648, mailed Jan. 30, 2009, 4 pages.

Office Action issued in related U.S. Appl. No. 11/580,220, mailed Feb. 24, 2009, 8 pages.

Office Action issued in related U.S. Appl. No. 11/326,806, mailed Feb. 26, 2009, 13 pages.

Menezes, Alfred J., "Handbook of Applied Cryptography", copyright 1997 by CRC Press LLC, pp. 22-23.

\* cited by examiner

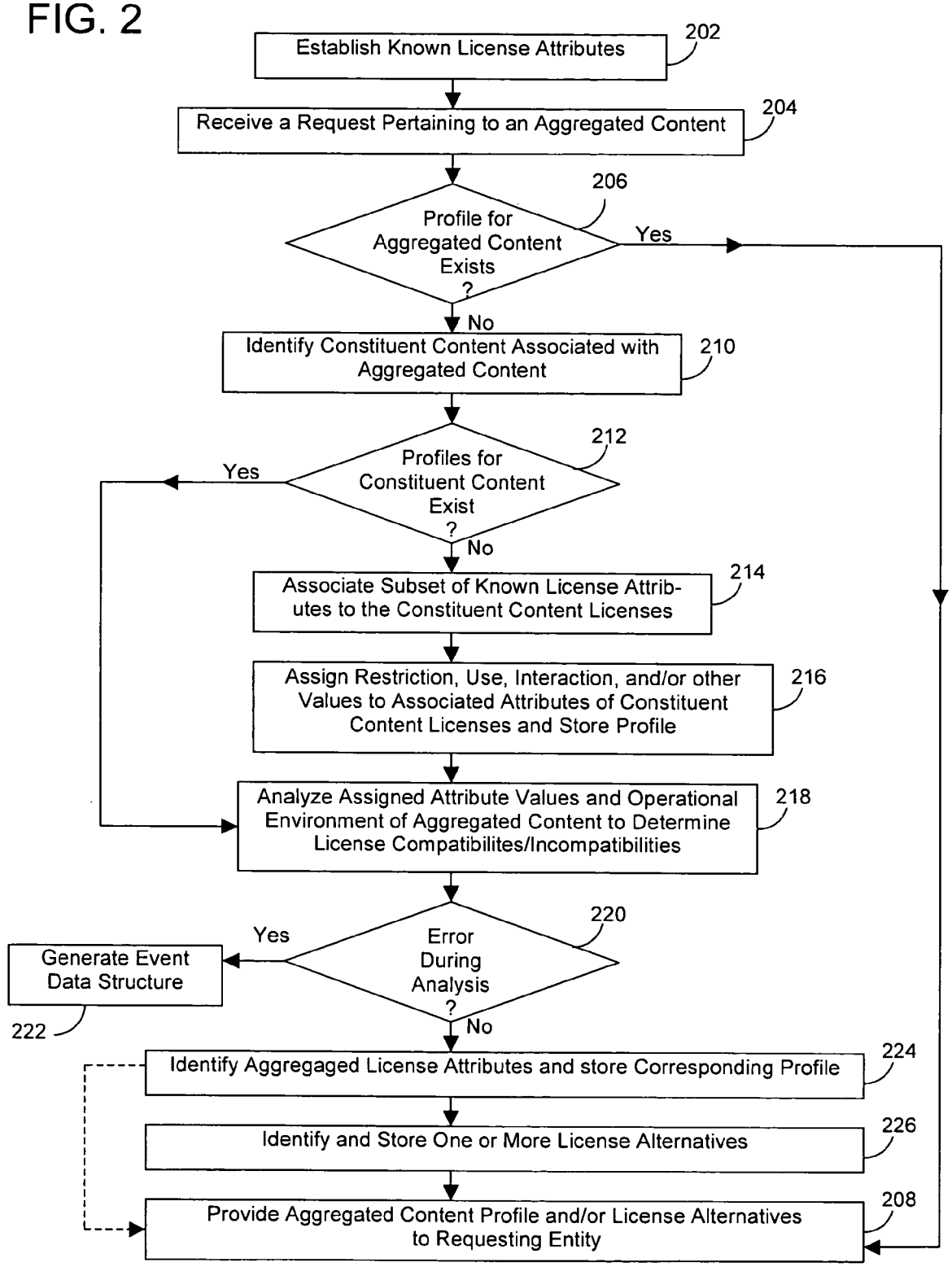

RESOLVING LICENSE DEPENDENCIES FOR AGGREGATIONS OF LEGALLY-PROTECTABLE CONTENT

RELATED APPLICATIONS

This is related to co-pending and concurrently-filed U.S. Utility patent application Ser. No. 10/728,173, entitled "Authenticating Licenses for Legally-Protectable Content Based on License Profiles and Content Identifiers," the entirety of which is incorporated herein by reference.

TECHNICAL FIELD

The disclosed technology relates generally to aggregations of legally-protectable content and more particularly to resolving license attributes to facilitate the aggregation of such content.

BACKGROUND

Individuals, groups, associations, organizations, and/or other types of entities interested in compiling, aggregating, and/or otherwise intermingling legally-protectable content such as music, art, video, text, multimedia, technology (e.g., software), technological/business know-how, contract rights, and/or any other type of content that is protectable under patent law, copyright law, trademark law, trade secret law, contract law, and/or under other legal bases need to consider the individual tights, restrictions, and/or prohibitions established by content owners for the use, distribution, modification, combination, interaction, and/or other manipulation of such content to avoid infringing upon the content owners' rights in that content. For example, recent trends in software development are indicative of a proliferation of collaborative development environments in which entities developing particular software elements share such elements with other entities, who may be potentially unrelated to the developing entities. This collaborative behavior may leverage the expertise in a particular industry, expedite the formation of industry standards, and/or reduce duplicative development efforts and time to market for software products. Unlike traditional development environments in which a single entity controls the entire development of a software product and the ownership and rights in the software product are well known and/or readily identifiable, the software products generated, at least in part, by aggregating software elements from multiple entities in a collaborative development environment, obfuscate the legal rights, obligations, restrictions, and/or prohibitions that pertain to an aggregated software product and thus increase the risk that the makers, distributors, users, and/or other entities associated with an aggregated software product may infringe upon the legal rights of one or more of the entities that developed the constituent software elements that were incorporated into the aggregated software product.

Although content owners can mitigate the uncertainty in the legal rights associated with particular aggregated content by forming licenses that explicitly set forth the rights, obligations, restrictions and/or prohibitions governing the use of aggregated content (e.g., the GNU General Public License, the Berkeley Software Distribution License, the Mozilla Public License, etc.), it becomes increasingly more difficult to do so as the number of collaborating content owners and the complexity of the aggregated content increase. Accordingly, entities participating in a collaborative environment have a continuing interest in developing technologies that can mitigate the risk of infringing another's rights in legally-protectable content incorporated into an aggregated content product and/or service.

SUMMARY

The disclosed technology can mitigate the risk of infringing a content owner's rights in legally-protectable content by comparing restrictions established by that content owner for the use, distribution, modification, combination, interaction, and/or other manipulation of such content with comparable restrictions associated with another content owner's rights in other legally-protectable content to identify compatibilities and/or incompatibilities in such owners' rights, particularly where at least certain aspects of the legally-protectable content are combined to form an aggregated content. The restrictions associated with legally-protectable content are typically represented as license terms in one or more license agreements. In addition to default terms that generally affect the use, distribution, modification, combination, interaction, and/or other manipulation of legally-protectable content, the disclosed technology can also compare the use, distribution, modification, combination, interaction, and/or other manipulations pertaining to particular license terms, which may differ from the default terms, and thus provide a term-by-term comparison of license agreements to identify compatibilities and/or incompatibilities in an aggregated content of interest. Maintaining a history of the particular license terms and/or comparisons thereof facilitate the generation of one or more license alternatives that may be implemented for an aggregated content of interest, particularly when one or more previously-aggregated content elements are combined with one or more new content elements to form a higher level of aggregated content.

In one embodiment, the disclosed technology can be used to develop systems and perform methods in which one or more known license attributes can be associated with a first license that contains restrictions pertaining to a first protectable content. The first license can be identified by, for example, analyzing the first protectable content. Restriction values can be assigned to each of the license attributes associated with the first license to specify particular restrictions pertaining to the first protectable content. Similarly, one or more use values and/or interaction values can also be assigned to at least some of the license attributes associated with the first license.

In one embodiment, one or more of the assigned use values and/or assigned interaction values can be equivalent to default use and/or interaction values associated with the first license, respectively. Alternatively, one or more of the assigned use values and/or assigned interaction values can override default use and/or interaction values associated with the first license, respectively. In one embodiment, the assigned restriction, use, and/or interaction values of at least some of the license attributes of the first license can override at least some of the corresponding attribute values associated with the second license to form attribute values associated with a third protectable content. In one embodiment, the assigned restriction, use, and/or interaction values of at least some of the license attributes of the first license can coexist along with at least some of the corresponding attribute values associated with the second license, as at least some attribute values of the attributes associated with the third protectable content. The assigned use values can represent a permissible degree of distribution of at least some aspects of the first protectable content. The assigned interaction values can represent a permissible degree of manipulation of at least some aspects of the first protectable content.

The restriction, use, and/or interaction values assigned to at least some of the license attributes of the first license can be compared with corresponding attribute values associated with a second license that contains restrictions pertaining to a second protectable content and such comparisons can serve as a basis for determining attributes associated with a third protectable content, where the third protectable content is based, at least in part, on a combination of at least some aspects of the first protectable content and the second protectable content.

The first and/or second protectable content can correspond to one or more multimedia presentations, video segments, audio segments, textual representations, works of art, visual representations, technological know-how (e.g., manufacturing processes), business know-how (e.g., marketing information), contract rights, and/or software elements (e.g., open source software compliant with an open source definition, proprietary software not compliant with an open source definition, etc.). In one illustrative embodiment in which the first and/or second protectable content correspond to one or more software elements, the license attributes that may be associated with the first license can, for example, correspond to one or more software code formats, software naming conventions, software code annotations, warranties, reverse-engineering activities, patent litigation activities, standards bodies, violations of intellectual property rights, and/or textual descriptions of at least one aspect of the first license. A restriction value that may be assigned to one or more of the license attributes can, for example, correspond to a prohibition, a requirement, or a nullity (a neutral value that may be, for example, equivalent to the terms, "none" or "not applicable") and can be set to, for example, true, false, required, don't care, forbidden, 1 (indicating a requirement), 0 (indicating a nullity), −1 (indicating a prohibition), and/or a textual value. A use value that may be assigned to one or more of the license attributes can, for example, correspond to an acquisition, a personal use, a research use, an organizational use, a limited distribution use, and/or an unlimited distribution use of one or more aspects of the first and/or second protectable content. Similarly, an interaction value that may be assigned to one or more of the license attributes can, for example, correspond to an original element, a modified element, a group of distinct elements, a group of interconnected elements, a group of elements capable of providing more than one function, an unrestricted manipulation of elements, and an unrestricted ownership of elements of one or more aspects of the first and/or second protectable content.

In one embodiment and based on a comparison of restriction, use, and/or interaction values assigned to at least some license attributes of a first license with corresponding values assigned to license attributes of a second license, values for license attributes associated with a third license and/or a third protectable content can be identified. The attribute values of the third protectable content can serve as a basis for determining one or more license alternatives (which may be stored in a network-accessible location) for the third protectable content and one or more of such license alternatives can be selected based on an operational environment associated with the third protectable content. The license attributes of the third protectable content can include one or more source values that may identify attribute information associated with the first and/or second licenses, which may have affected corresponding values of the third protectable content. The license attributes and associated values of the first, second, and/or third license can be stored and used to determine license attributes and/or license attribute values associated with a fourth protectable content that may be based on a combination of at least some aspects of the first protectable content, second protectable content, and/or third protectable content. The attribute values of the fourth protectable content can serve as a basis for determining one or more license alternatives (which may be stored in a network-accessible location) for the fourth protectable content and one or more of such license alternatives can be selected based on an operational environment associated with the fourth protectable content.

In one embodiment, event information, such as may be associated with an error, a warning, and/or a conflict, detected during the comparison of attribute values can be stored in one or more event data strictures. By way of non-limiting example, event information can include indicia pertaining to an event type, a frequency of occurrence of the event type, a related use value, a related interaction value, and/or an identifier associated with the first and/or second license.

In one embodiment, the disclosed technology can be used to develop systems and perform methods in which one or more first license attributes associated with a first protectable content and one or more second license attributes associated with a second protectable content can be identified. The first and/or second license attributes can be identified by, for example, analyzing the first and/or second protectable content, respectively. One or more restriction values can be assigned to each of the first and second license attributes to specify particular restrictions pertaining to the first protectable content and second protectable content, respectively. A use value, representing a permissible degree of distribution of the first protectable content, and/or an interaction value, representing a permissible degree of manipulation of the first protectable content, can be assigned to at least some of the first license attributes. Similarly, a use value, representing a permissible degree of distribution of the second protectable content, and/or an interaction value, representing a permissible degree of manipulation of the second protectable content, can be assigned to at least some of the second license attributes. A comparison between at least some of the assigned restriction, use, and/or interaction values of the first license attributes with corresponding restriction, use, and interaction values of the second license attributes can serve as a basis for determining license alternatives affecting an aggregated content that is based on a combination of at least some aspects of the first and second protectable content.

The first and/or second protectable content can correspond to one or more multimedia presentations, video segments, audio segments, textual representations, works of art, visual representations, technological know-how (e.g., manufacturing processes), business know-how (e.g., marketing information), contract rights, and/or software elements (e.g., open source software compliant with an open source definition, proprietary software not compliant with an open source definition, etc.). In one illustrative embodiment in which the first and/or second protectable content correspond to one or more software elements, the particular restrictions pertaining to the first and/or second protectable content can, for example, correspond to one or more software code formats, software naming conventions, software code annotations, warranties, reverse-engineering activities, patent litigation activities, standards bodies, violations of intellectual property rights, and/or textual descriptions of one or more aspects of the first and/or second protectable content. A restriction value that may be assigned to one or more of the first and/or second license attributes can, for example, correspond to a prohibition, a requirement, or a nullity (a neutral value that may be, for example, equivalent to the terms, "none" or "not applicable"). One or more of the use values that may be assigned to one or more of the first and/or second license attributes can, for example, correspond to an acquisition, a personal use, a research use, an organizational use, a limited distribution use, and/or an unlimited distribution use of one or more aspects of the first and/or second protectable content. Similarly, one or more of the interaction values that may be assigned to one or more of the first and/or second license attributes can, for example, correspond to an original element, a modified element, a group of distinct elements, a group of interconnected elements, a group of elements capable of providing more than one function, an unrestricted manipulation of elements, and an unrestricted ownership of elements of one or more aspects of the first and/or second protectable content.

In one embodiment, one or more of the assigned use values and/or assigned interaction values of the first and/or second license attributes can be equivalent to default use values and/or default interaction values. Alternatively, one or more of the assigned use values and/or assigned interaction values of the first and/or second license attributes can override default use values and/or default interaction values. In one embodiment, the assigned restriction, use, and/or interaction values of the first license attributes can override at least some of the restriction, use, and/or interaction values assigned to the second license attributes to form attribute values associated with an aggregated content. In one embodiment, at least some of the assigned restriction, use, and/or interaction values of the first license attributes can coexist along with at least some of the restriction, use, and/or interaction values assigned to the second license attributes, as at least some attribute values associated with the aggregated content.

In one embodiment, the disclosed technology can be used to develop systems and perform methods in which requests are received to identify a license of an aggregated content, which is based, at least in part, on a combination of constituent protectable-content elements. Licenses associated with a first one of the constituent protectable-content elements can be identified along with one or more license associated with each of the other constituent protectable-content elements. License attribute values associated with each of the licenses of the first constituent protectable-content element can be compared with corresponding license attribute values associated with each of the other constituent protectable-content elements and such comparison can serve, at least in part, as a basis for identifying license alternatives for the aggregated content. The requested license for the aggregated content can be selected from among the license alternatives based, at least in part, on an operational/deployment environment of the aggregated content.

BRIEF DESCRIPTION OF THE DRAWINGS

The foregoing discussion will be understood more readily from the following detailed description of the disclosed technology, when taken in conjunction with the accompanying drawings in which:

FIG. 2 illustrates an exemplary methodology that may be performed by one or more software processes executing within the collaboration architecture of FIG. 1 to identify an aggregated license for an aggregated content of interest.

DETAILED DESCRIPTION

Figure 1:
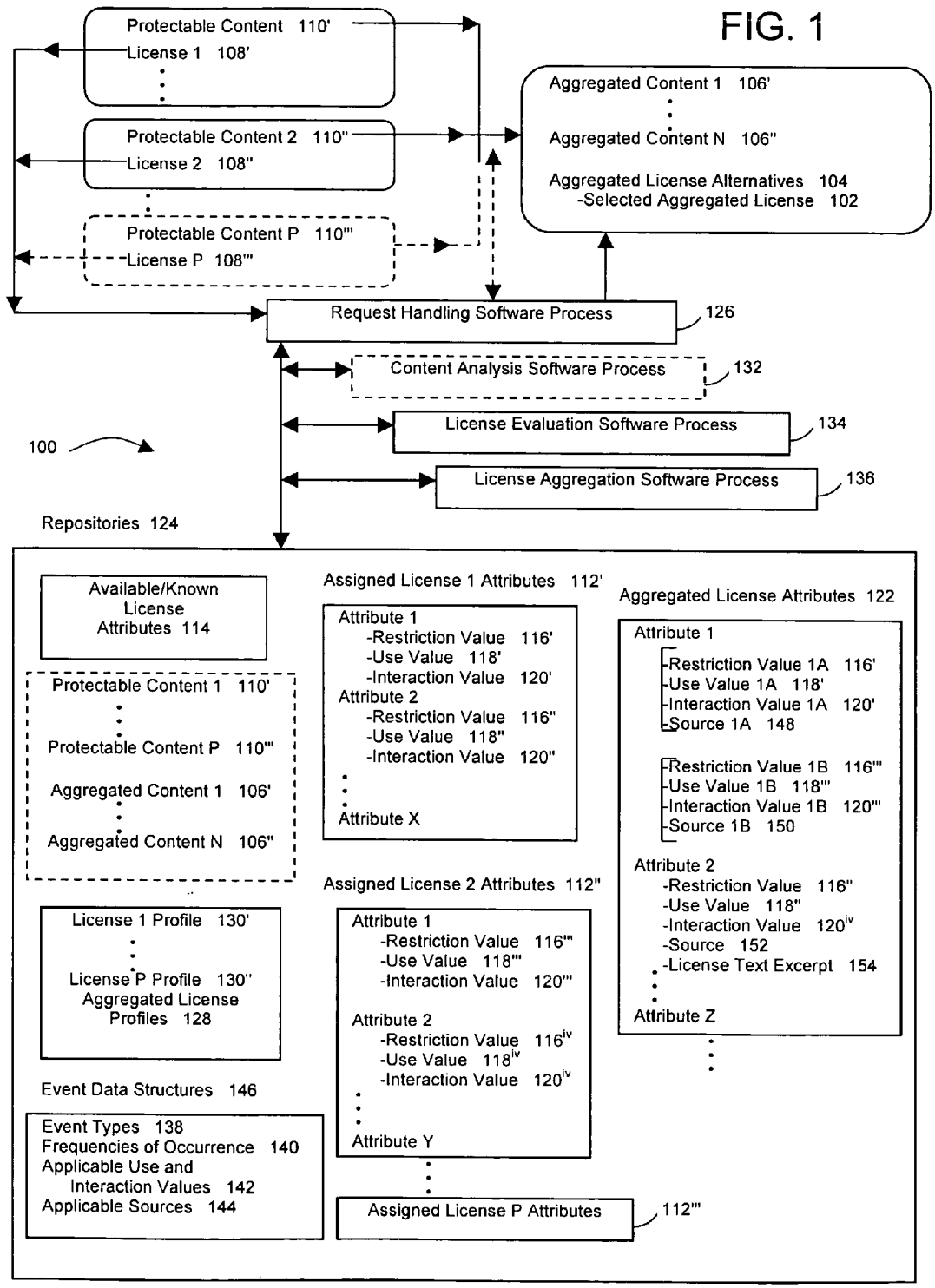
FIG. 1 schematically illustrates an exemplary collaboration architecture employing aspects of the disclosed technology that can be used to identify one or more aggregated licenses for an aggregated content that is based on a combination of individually-licensed, protectable-content elements.

Unless otherwise specified, the illustrated embodiments can be understood as providing exemplary features of varying detail of certain embodiments, and therefore, unless otherwise specified, features, components, processes, elements, data, attributes, attribute values, and/or aspects of the illustrations can be otherwise combined, interconnected, sequenced, separated, interchanged, and/or rearranged without departing from the disclosed systems or methods. Additionally, the shapes, sizes, and orientations of elements are also exemplary and unless otherwise specified, can be altered without affecting the disclosed technology.

For the purposes of this disclosure, the term "software process" can refer to a set of executable instructions, operations, variables, parameters, data, data structures, software drivers, plug-ins, and/or any other type of elements that are needed to form an execution environment sufficient to perform the desired functionality of the process. Those skilled in the art will recognize that the functionality described for a particular software process can be incorporated into one or more other processes and that the software processes themselves can be otherwise combined, separated, and/or organized without adversely affecting the operation of the disclosed technology and thus are intended merely for illustrative purposes. The term, "data structure," can refer to a database table, a linked list, and/or any other type of data format or configuration that enables a data set to be referenced.

For the purposes of this disclosure, the term "content" (also referred to herein as "protectable content," "protectable-content element," or "constituent protectable-content element") can be construed broadly to refer, separately or in any combination, to one or more multimedia presentations, video segments, audio segments, textual representations, works of art, visual representations, technological know-how (e.g., manufacturing processes), business know-how (e.g., marketing information), contract rights, software elements (e.g., open source software compliant with an open source definition, proprietary software not compliant with an open source definition, etc.), and/or any other type of matter/representation that may be, legally-protectable under patent law, copyright law, trademark law, trade secret law, contract law, and/or under other legal bases. "Aggregated content" (also referred to herein as an "aggregated-content element") can refer to a collection and/or combination of at least some aspects of two or more protectable-content elements that cooperate to perform one or more desired functions, where such protectable-content elements may be separately and/or individually licensed. Those skilled in the art will recognize that aggregated-content elements can also be combined with other aggregated and/or non-aggregated content elements to form content elements that exhibit relatively higher levels of aggregation.

For the purposes of this disclosure, the term "software code" can refer broadly to source code and/or object code, where source code refers to programming statements generated by and/or readily identifiable by a software programmer and where object code refers to a compiled version of the source code that is understood by a processor of a digital data processing device, but which is difficult to understand and/or manipulate by a human.

For the purposes of this disclosure, the term "license" can refer to a collection of clauses (i.e., license terms) that set forth restrictions (e.g., requirements, obligations, grants, prohibitions, limitations, etc.) that may affect a use (e.g., distribution), interaction (e.g., modification, combination), and/or other manipulation of content. "License alternatives" can refer to one or more licenses that may be suitable for a particular operational/deployment environment of an aggregated-content element. An "aggregated license" can refer to a license that sets forth restrictions for an aggregated-content element.

For the purposes of this disclosure, "license attributes" can refer to representations of license restrictions that may be processed by software processes executing on one or more digital data processing devices. A collection of license attributes associated with a particular protectable content and/or a particular license can be referred to as a "license profile." License attributes can exhibit one or more restriction values, use values, and/or interaction values that facilitate an attribute-by-attribute analysis of two or more protectable-content elements that form at least part of an aggregated content. A restriction value can specify an applicability of one or more license attributes to a content element by, for example, specifying if such attributes are required, prohibited, not applicable, true, false, or the like. A use value can represent a permissible degree of distribution associated with one or more license attributes. Similarly, an interaction value can represent a permissible degree of manipulation associated with one or more license attributes.

By way of non-limiting example and with reference to an embodiment in which protectable content refers to software elements, a non-exclusive list of license attributes that may be associated with such software elements can correspond to one or more software code formats (e.g., requirement for providing access to source code if executable code is distributed, requirement to make newly-added software code available in a source code format, requirement to distribute newly-added source code under terms of a particular license, etc.), software naming conventions (e.g., requirement that non-original software files be renamed to avoid conflict with names of original software files), software code annotations (e.g., requirement that a notification be added to modified executable and/or source code), warranties (e.g., disclaimer of warranties and liability for original source code), fees (e.g., allowing warranty fees, distribution/media cost-recovery fees, and/or software program fees associated with one or more software elements, etc.), reverse-engineering activities (e.g., requirement that distributed and/or newly-added software code be capable of reverse-engineering), patent litigation activities (e.g., contingency in which initiation of a patent litigation terminates a license), standards bodies (e.g., requirement that newly-added software code conform to applicable standards specified by a particular standards body), violations of intellectual property rights (e.g., requirement that contributors of new software code warrant that such new code is free of intellectual property violations and that all applicable rights have been properly secured, prohibition against using the name and trademarks associated with an original software element and/or original author in promoting modified software code, etc.), and/or textual descriptions of corresponding licenses (e.g., requirement to include the actual text of an original license when distributing corresponding software code, requirement to include explanatory license text for software modifications, requirement to display notifications during execution of software code, requirement to provide license text regarding a distribution term and/or attribution procedures, etc.). As described above, restriction values can specify an applicability of one or more such license attributes to a software element by, for example, specifying if such attributes are required, prohibited, not applicable, true, false, etc. Continuing with the exemplary software element embodiment, use values assigned to one or more license attributes can, for example, correspond to an acquisition, a personal use, a research and development use, an organizational use (e.g., a deployment of software code within an organization in a form that may exceed personal use and/or research and development use), a limited distribution use (e.g., a deployment of software code without wide distribution), and/or an unlimited distribution use (e.g., a distribution of software code to unrelated entities) of at least one aspect of a software element. Similarly, interaction values assigned to one or more license attributes can, for example, correspond to an original software element (e.g., unmodified source code), a modified software element (e.g., original source files that have been altered by the addition of new code or the deletion of some original code), a group of distinct software elements (e.g., a collection of original and added source code files forming a software module), a group of interconnected software elements (e.g., a collection of original and/or added source code and object code files forming a library, where such files are meant to be linked with other software elements), a group of software elements capable of providing one or more functions (e.g., software code capable of being compiled into an executable software application program, software code capable of providing separate and interoperable software application programs, etc.), an unrestricted manipulation of software elements, and/or an unrestricted ownership of software elements.

For the purposes of this disclosure, the term "event" can refer to one or more errors, warnings, conflicts, and/or other types of occurrences that may occur when evaluating, aggregating, and/or otherwise processing license attributes. Event information that may be stored in corresponding event data structures may include, for example, an event type (e.g., copyright detection, author detection, license attribute conflict, etc.), an event counter that specifies a frequency of occurrence for a particular event, indicia pertaining to a use and/or interaction value associated with an event, and/or indicia (e.g., a name/identifier, a value, a type, and/or a directory path associated with one or more aggregated-content elements and/or protectable-content elements) pertaining to a source of information associated with an event.

Collaborative development environments in which individuals, organizations, and/or other entities engage in joint intellectual, artistic, and/or other expressive efforts to advance/expedite development in an area of interest may necessitate interactions with content that may be proprietary to one or more of such entities. Restrictions affecting a use (e.g., distribution), interaction (e.g., modification, combination), and/or other manipulation of protectable content can be stipulated by an owner of such content in license terms set forth, for example, in one or more license agreements that may enable interested parties to use and/or interact with the content in a manner that facilitates collaboration, while concurrently avoiding infringement of the content owner's rights in such protectable content. The likelihood of infringing a content owner's rights in protectable content is particularly acute in situations in which two or more protectable-content elements are combined and/or otherwise manipulated to form an aggregated content, which may be subject to the restrictions of its constituent, protectable-content elements as may be set forth as terms in one or more licenses.

In brief overview and with reference to the illustrative embodiment shown in FIG. 1, a collaboration architecture 100 employing aspects of the disclosed technology can be used to select/identify an aggregated license 102, from perhaps a multitude of aggregated license alternatives 104, that sets forth restrictions affecting one or more aggregated-content elements 106, where such restrictions are based, at least in part, on restrictions contained within licenses 108 associated with protectable content 110 that forms such aggregated content 106. The restrictions contained within such constituent, protectable-content licenses 108 can be represented as license attributes 112 that are drawn from a set of known/available license attributes 114 and such license attributes 112 can be assigned one or more restriction values 116, use values 118, and/or interaction values 120, which facilitate a comparative attribute-by-attribute analysis of the constituent, protectable-content licenses 108 and thus enables the identification of aggregated license attributes 122 and associated values that form the basis for one or more aggregated license alternatives 104.

Although one or more of the exemplary embodiments provided herein describe applications of at least some aspects of the disclosed technology to a pair of licenses 108', 108" and/or a pair of protectable content elements 110', 110", those skilled in the art will recognize that the disclosed technology can be applied to substantially any number of licenses, license combinations, protectable content elements, and/or protectable content element combinations/aggregations and, thus, such exemplary embodiments are merely illustrative and are not intended to be limiting in any respect. Further and although one or more of the exemplary embodiments provided herein describe comparative attribute-by-attribute analyses of license attributes 112 in which a particular attribute/attribute value of a first license 108' is compared with a corresponding attribute/attribute value of a second license 108", those skilled in the art will recognize that the disclosed technology can be applied to a wide variety of attribute/attribute value analyses such as, for example, when two or more attributes/attribute values of a first license 108' are compared with each other and/or with one or more attributes/attribute values of one or more other licenses to identify aggregated license attributes 122 and associated values that form a basis for one or more aggregated license profiles 128 and/or aggregated license alternatives 104 and, thus, such exemplary embodiments are merely illustrative and are not intended to be limiting in any respect. By way of non-limiting example and with reference to an embodiment in which protectable content refers to software elements, two distinct attributes and their associated attribute values of a first exemplary license may require that access to original (unmodified) source code and access to added source code (e.g., source code that is added to the original source code) be made available to a user if corresponding executable code is distributed to the user, but these two attributes and associated attribute values may conflict with, for example, a single attribute/attribute value of a second exemplary license that may prohibit distribution of source code. The corresponding attributes and associated attribute values of the resulting aggregated license profile, in this non-limiting example, may therefore include indicia representative of such distribution incompatibilities.

In more detail and with reference now also to an illustrative operation as shown in FIG. 2, an administrator and/or other entity (not shown) authorized to configure a collaboration architecture 100 employing at least some aspects of the disclosed technology can identify known types of license attributes 114 that may be associated with one or more protectable-content elements 108 and can make such known license attributes 114 available in one or more repositories 124 (e.g., databases) to support subsequent attribute-processing activities that may involve the collaboration architecture 100 (202). The known license attributes 114 can, for example, represent types of license restrictions that may occur in licenses that affect transactions in one or more industries (e.g., music industry, software industry, etc.) and/or operational environments.

Once the repository 124 of the collaboration architecture 100 is populated with known license attributes 114, a request handling software process 126 can receive a request to, for example, identify one or more license alternatives 104 and/or aggregated license attributes 122 associated with an aggregated content of interest 106 (204). The aggregated content of interest 106 can, for example, correspond to aggregated content that already exists, aggregated content that is currently under development, and/or aggregated content that is being considered for development. As will be recognized by those skilled in the art, a request can be provided to the request handling software process 126 via an electronic message (e.g., electronic mail message), an electronic document (e.g., an electronic file), an input data stream (e.g., keyboard and/or mouse actions), a web page, and/or in any other manner which enables the request handling software process 126 to reliably receive and identify information pertaining to an aggregated content of interest 106 (e.g., name and/or other indicia of the aggregated content 106, name and/or other indicia of the constituent protectable-content elements 110 that form such aggregated content 106, license information associated with the aggregated content 106 and/or constituent protectable content 108, etc.).

In response to receiving a request, the request handling software process 126 can search one or more repositories 124 to ascertain whether one or more license profiles 128 of the aggregated content 106 are stored therein (206). If an aggregated license profile 128 exists, the request handling software process 126 can provide the requesting entity with such license profile 128 and/or with one or more corresponding aggregated license alternatives 104, from which a selected aggregated license 102 maybe selected (208). If an aggregated license profile 128 is not located within one or more of the repositories 124, the request handling software process 126 can identify constituent, protectable-content elements 110 (which may also be stored in one or more of the repositories 124) that form the aggregated content of interest 106 from information contained within the received request and/or by instructing a content analysis software process 132 to analyze the aggregated content of interest 106 (which may also be stored in one or more of the repositories 124) to identify its constituent protectable-content elements 110 by, for example, searching for particular segments of software code, embedded copyright information, embedded license information, embedded ownership information, embedded version information, and/or any other type of indicia useful in identifying the constituent protectable-content elements 110 (210). Similarly, licenses 108 associated with the constituent protectable content 110 can be identified from information contained within the received request and/or from information embedded in the constituent protectable content 110 and discovered by the content analysis software process 132.

In response to identifying the licenses 108 (which may also be stored in one or more repositories 124) associated with the constituent protectable-content elements 110, the request handling software process 126 can make a determination whether one or more license profiles 130 representing such licenses 108 exist by, for example, searching one or more repositories 124 for such profile information (212). This determination can affect whether a license evaluation software process 134 needs to initially form one or more new license profiles 130 for the licenses 108 of the constituent protectable-content elements 110 (in the case where license profiles 130 do not exist) prior to analyzing the attribute values of such protectable content 110 to identify compatibilities and/or incompatibilities in their corresponding licenses 108.

For example and if license profiles 130 for the licenses 108 of constituent protectable-content elements 110 do not yet exist, the request handling software process 126 can instruct a license evaluation software process 134 to evaluate the licenses 108 to determine relevant subsets of the known license attributes 114 that may be assigned/associated to represent such licenses 108 (214). The license evaluation software process 134 can identify relevant subsets of the known license attributes 114 by, for example, mapping restrictions contained within license terms in the licenses 108 to particular known license attributes, evaluating information contained within the request received by the request handling software process 126 that pertains to the licenses 108 and/or associated license restrictions, and/or based on additional information provided by the requesting entity and/or administrator/authorized user of the collaboration architecture 100. Once the relevant subsets of the known license attributes 114 have been identified and assigned to represent the licenses 108 of the constituent protectable-content elements 110, the license evaluation software process 134 can further analyze the licenses 108 to assign one or more restriction values 116 (specifying an applicability of an associated attribute), use values 118 (specifying a permissible degree of distribution that may cause an associated attribute to become applicable), interaction values 120 (specifying a permissible degree of manipulation that may be associated with a particular attribute), and/or other values (e.g., license text excerpts and/or other license identifying information associated with an attribute) to one or more of the assigned attributes 112 and these attributes and attribute values can be stored in one or more license profiles 130 in a repository 124, which may facilitate future processing activity within the collaboration architecture 100 if and/or when such licenses 108 are encountered again (216). Although the assigned attributes 112 in the FIG. 1 embodiment indicate that corresponding restriction, use, and interaction values 116-120 are assigned to each of the attributes 112, those skilled in the art will recognize that one or more of such values 116-120, separately or in any combination, need not be assigned to any particular attribute 112 and that the illustrated embodiment is merely exemplary of one possible embodiment and is not intended to be limiting in any respect. Further, the licenses 108 of one or more constituent protectable content elements 110 can include license terms that specify default distribution and/or manipulation restrictions that may be represented as common use and/or interaction values for at least some of the attributes 112 of corresponding license profiles 130, although the disclosed technology can also accommodate particular use and/or interaction values that may override such common/default values as required. In one illustrative embodiment, default restrictions in license terms can be represented as use, interaction, and/or other types of values that can be shared among license attributes 112 by, for example, assigning such default values to corresponding attributes (that do not have any overriding values that supersede the default values), assigning pointers and/or other indicia to the corresponding attributes so that default values can be referenced and taken into account during subsequent processing activities, and/or via any other method or mechanism which provides access to such default values during processing activities performed by a license aggregation software process 136, whose functionality is further described below.

Upon completion of the license profiles 130 and/or if such license profiles 130 previously existed, a license aggregation software process 136 can analyze the attribute values 116-120 of one or more attributes 112 associated with the constituent protectable-content elements 110 forming at least part of an aggregated content 106 in view of an intended operational/deployment environment and/or other operational parameters associated with the aggregated content 106 to determine specific attribute and/or attribute value compatibilities and/or incompatibilities between the licenses 108 of such constituent protectable-content elements 110 (218). If an incompatibility and/or other type of error, warning, and/or information is detected during this analysis (and which is not already identified as an attribute value) (220), the license aggregation software process 136 can generate event data such as, for example, an event type 138, a frequency of occurrence 140 of an event, indicia of use and/or interaction values associated with an event 142, and/or other indicia that may pertain to a source of information for the event and such event data can be stored in one or more event data structures 146, which may be stored as part of one or more license profiles 128, 130 and/or as separate data structures within one or more repositories 124 (222). The event data structures 146 can be useful in resolving incompatibilities between licenses 108 that may be specific to such licenses 108 and thus may not have been otherwise accounted for in values 116-120 assigned to corresponding license attributes 112. For example, event data 138-144 stored within one or more event data structures 146 can be communicated to an entity that submitted a corresponding request that was received by the request handling software process 126 and/or to other interested entities (e.g., one or more content owners or entities affiliated with such content owners that are associated with the protectable content 110 and/or aggregated content 106) and such entities can seek waivers, new license terms, a redesign of the aggregated content 106, a modification of the operational/deployment environment of the aggregated content 106, new design alternatives, and/or other types of corrective action that can mitigate the risk of infringing a content owner's rights in the protectable content 110 and/or aggregated content 106 associated with the detected incompatibilities. In addition to detecting and resolving incompatibilities, event data structures 146 can also include warnings and/or other information that may be addressed in a more subtle manner than that discussed above, such as by, for example, identifying text (e.g., notices describing operational boundaries associated with the operational/deployment environment of the aggregated content 106) that needs to be inserted into one or more aggregated license alternatives 104 associated with the aggregated content 106.

In more detail and with respect to one illustrative embodiment, a license aggregation software process 136 can compare one or more attribute values 116'-120,' 116"-120" associated with one or more license attributes 112' of a first license 108' with one or more corresponding attribute values 116'''-120,''' 116$^{iv}$-120$^{iv}$ associated with one or more license attributes 112" of a second license 108" to identify aggregated license attributes 122 associated with an aggregated content of interest 106. Aggregated license attributes 122 can be stored as one or more aggregated license profiles 128 in one or more repositories 124, which may facilitate future processing activity within the collaboration architecture 100 if/when such aggregated license profiles 128 are needed again (224). Attributes and attribute values of the first license 108' can be compared with corresponding attributes and attribute values of the second license 108" in an attribute-by-attribute and/or attribute value-by-attribute value manner to ensure that any compatibilities and/or incompatibilities that may be associated with the combination of protectable content elements 110', 110" to form an aggregated content 106, targeted for deployment/operation in a particular manner/environment, are identified at a level of granularity sufficient to reliably detect potential/actual infringement risks associated with particular aspects of the aggregated content 106. Similarly, the attribute-by-attribute and/or attribute value-by-attribute value comparison can serve as a basis for determining whether particular aspects of the aggregated content 106 are also governed by the attributes/license terms of the first license 108', the attributes/license terms of the second license 108", and/or any combinations (e.g., one or more of the attributes and/or attribute values of the first license 108' may govern an aspect of the aggregated content 106, while one or more of the attributes and/or attribute values of the second license 108" may govern a different aspect of the aggregated content 106) and/or hybrids thereof (e.g., attribute values associated with an attribute of the first license 108' and attribute values associated with an attribute of the second license 108" may be assigned to a common attribute of the aggregated content 106 and thus coexist as further discussed below, one or more attribute values associated with an attribute of the first license 108' may override attribute values associated with an attribute of the second license 108" in some situations or be overridden thereby in other situations, etc.). Those skilled in the art will recognize that this type of analysis can be performed for any number of attributes, attribute values, and/or licenses and that the disclosed embodiments are merely illustrative and are not intended to be limiting in any respect.

In one embodiment, the restriction, use, and/or interaction values 116'-120' assigned to an attribute 112' of a first license 108' may coexist with one or more of the restriction, use, and/or interaction values 116'''-120''' assigned to an attribute 112" of a second license 108", if such values do not result in a dominant or subservient relationship that would necessitate a modification in the attribute values of a corresponding aggregated license attribute 122 (see, for example, the attribute values assigned to Aggregated License Attribute 1 in FIG. 1). For example, one or more coexisting values and/or value sets 116'-120' and 116'''-120''' for a first attribute of an aggregated content 106 may reflect optional occurrences within an operational/deployment environment, such as when, for example, license fees are forbidden when the aggregated content 106 is used for research and development purposes, but fees are required when the aggregated content 106 is widely distributed. In this manner, the disclosed technology can be used to generate one or more aggregated license alternatives 104, based on attributes whose values may accommodate a diverse spectrum of occurrences within one or more operational/deployment environments. Those skilled in the art will recognize that multiple values and/or value sets can be assigned to a wide variety of different attribute types and that the disclosed examples and embodiments are merely illustrative and are not intended to be limiting in any respect.

In one embodiment, one or more restriction, use, and/or interaction values 116"-120" assigned to an attribute 112' of a first license 108' may dominate or be subservient to one or more restriction, use, and/or interaction values 116$^{iv}$-120$^{iv}$ assigned to an attribute 112" of a second license 108", which may necessitate that attribute values of a corresponding aggregated license attribute (see, for example, Aggregated License Attribute 2 in FIG. 1) reflect a combination of attribute values associated with the corresponding attributes of the first and second license 108', 108" (which may occur if there is partial domination or subservience) or reflect one set of attribute values in the case where there is complete domination or subservience. For example, a restriction value of an attribute associated with a first license may be more restrictive (e.g., recite a requirement or prohibition of the associated attribute) than a restriction value of an attribute associated with a second license (e.g., when a neutral/don't care value is specified) in which case, the restriction value of the first license governs the combination of such values and is thus represented as a restriction value to a corresponding attribute of an aggregated content. Similarly, use and/or interaction values of an attribute associated with a first license may also be more or less restrictive than use and/or interaction values of an attribute associated with a second license and the selection of the controlling values for the corresponding attribute of the aggregated content can be based, at least partly, on the relative restrictiveness of such values. In this manner, the disclosed technology can be used to generate one or more aggregated license alternatives 104, based on attributes whose values reflect the more restrictive aspects of constituent protectable content licenses and which thus mitigates the risk of infringing one or more of such licenses in a particular operational/deployment environment.

In one illustrative embodiment, an aggregated license profile 128 and/or one or more other data strictures stored within a repository 124 of the collaboration architecture 100 can include content-descriptive information (not shown) that characterizes one or more aspects of the aggregated content 106 itself, rather than or in addition to the aggregated license attributes 122 and associated attribute values that pertain to license terms of one or more aggregated license alternatives 104. By way of non-limiting example and with respect to an exemplary embodiment in which an aggregated content 106 refers to an aggregation of one or more software elements, content-descriptive information can correspond to manipulations/interactions of at least some aspects of constituent protectable content elements 110 that form such aggregated content 106 and can, for example, specify whether the aggregated content 106 includes a software library formed from a combination of source code from the constituent protectable content elements 110, whether the aggregated content 106 includes a software application formed from a combination of software libraries from the constituent protectable content elements 110, and/or the like.

in one illustrative embodiment, an aggregated license profile 128 and/or one or more other data structures stored within a repository 124 of the collaboration architecture 100 can include profile-override information (not shown) that can be used to, for example, add/modify/delete one or more attributes 112 and/or associated attribute values in a license profile 130 of a constituent protectable content element 110 that forms an aggregated content of interest 106, so as to accommodate special situations where, for example, a user of the aggregated content 106 obtains a waiver and/or otherwise negotiates with an authorized owner of the constituent protectable element 110 to obtain license terms that differ from those originally expressed in a license 108 of the constituent protectable content 110 and which enable the user to interact with the aggregated content 106 in a desired manner. Accordingly, the profile-override information can be used by a license evaluation software process 134 and/or license aggregation software process 136 to custom-design license profiles 130 and aggregated license profiles 128 for particular users and/or particular operational/deployment environments. By way of non-limiting example and with reference to an embodiment in which protectable content 110 refers to one or more software elements, a potential distributor of an aggregated software product 106 who wants to distribute such product 106, but is prevented from doing so because of distribution incompatibilities in the license terms of its constituent software elements 110, can obtain authorization from an authorized content owner to modify particular license terms that cause such incompatibilities so that the aggregated software product 106 can be distributed as desired. The authorization obtained from the content owner can be represented as profile-override information that can override (e.g., add, modify, delete) one or more attributes/attribute values of a license profile 130 that governs one or more of such constituent software elements 110 and when such attributes and attribute values are combined, by a license aggregation software process 136, with corresponding attributes and attribute values of other constituent license profiles 130, the resulting aggregated license profile 128 and/or aggregated license alternatives can reflect such overriden attributes/attribute values that enable the distributor of the aggregated software product 106 to distribute such aggregated software product 106 as authorized/desired. Those skilled in the art will recognize that profile-override information is one example of various types of data/information that can be stored within an aggregated license profile 128 and/or other data structure in the repository 124 of the collaboration architecture to describe and/or affect how a particular aggregated license profile 128 was formed.

Additional values that may be assigned to aggregated license attributes 122 and/or stored in source data structures (not shown) may include source information/values 148-152 (e.g., indicia pertaining to related license clauses/attributes, storage location within a repository 124, etc.), license text excerpts 154 (that maybe used to explain particular aggregated license attributes 122), and/or any other type of information that may be useful in characterizing/profiling an aggregated content of interest 106. Source information and associated values 148-152 assigned to aggregated license attributes 122 can provide information that is useful in identifying and/or locating the license attributes 112 and/or attribute values 116, 120 associated with constituent protectable content 110 that participated in the formation and/or assignment of the aggregated license attributes 122 and/or values. A source value 148 assigned to a particular aggregated license attribute 122 and/or stored in a source data structure can, for example, identify a file name, a license name/identifier, a directory path of a license and/or license attribute, a particular location within a file, a list of associated protectable content 110, a list of associated aggregated content 106, and/or any other type of information that is useful in tracking and reporting issues and/or other information pertaining to processing activity performed by the license aggregation software process 136 during its formation of the aggregated license attributes. In one embodiment, the source information 148-152 can be used in concert with event data 138-144 stored in the event data structures 146 to identify and locate those elements of the collaboration architecture 100 that were processed and that contributed to particular event types, thereby facilitating troubleshooting and/or other remedial activities. Similarly text, such as license text excerpts 154 from one or more licenses 108, may be included/assigned to one or more aggregated license attributes 122 and may include, for example, modification instructions, distribution information, author attribution information, operational notices (e.g., software runtime notices), publishing information, transferability information, devices/platforms that may be used together with the aggregated content, governing jurisdictions, and/or any other type of information that is useful in forming one or more aggregated license alternatives, resolving incompatibilities, and/or providing information that mitigates a likelihood of infringement. In this manner, license text excerpts 154 and/or other textual information can facilitate the formation of aggregated license alternatives (and may be included entirely or partly in such licenses) and/or facilitate the resolution of incompatibilities.

Those skilled in the art will recognize that more than one aggregated license profile 128 may exist for a particular aggregated content 106, particularly where one or more of its constituent protectable-content elements 110 can be governed by more than one license 108. In such situations, multiple aggregated license profiles 128 can be formed to represent the various permutations of licenses and associated license attributes. Particular aggregated license profiles 128 that are not compatible with an operational environment of the corresponding aggregated content of interest 106 can be discarded. Otherwise one or more aggregated license profiles 128 that are viable relative to the operational environment of the aggregated content 106 can be used by the license aggregation software process 136 to generate, identify, and/or store one or more aggregated license alternatives 104 for the aggregated content 106 (226). In one embodiment, the license aggregation software process 136 can generate the license alternatives 104 by, for example, mapping the aggregated license attributes 122 and associated attribute values to license clause templates that can be updated to represent the desired license alternatives. In one embodiment, the request handling software process 126 can provide the aggregated content profile 128 for an aggregated content of interest 106 to a requesting entity that can subsequently use the profile information to generate the legal language forming the aggregated license alternatives 104 and the resulting license alternatives can be subsequently stored in one or more repositories.

In more detail and with respect to one illustrative embodiment, the operation, deployment, and/or manipulation of a particular protectable content element 110 can be governed by one of several different license alternatives. In order to support the combination of at least some aspects of this protectable content 110 with that of other protectable content, which may also be governed by more than one license, to form an aggregated content 106, the disclosed technology can process the various permutations in license alternatives by, for example, performing an attribute-by-attribute and/or attribute value-by-attribute value comparison for the attributes in these sets of license alternatives. For example, if a first protectable content has two license alternatives (e.g., L1 and L2) and a second protectable content has three license alternatives (e.g., L3, L4, and L5), the disclosed technology can process permutations of such licenses that may include combinations involving license pairs L1L3, L1L4, L1L5, L2L3, L2L4, and L2L5. Those skilled in the art will recognize that the disclosed technology can be applied to any number of licenses, protectable content elements, and/or other license combinations that may differ from license pairs (e.g., if three or more protectable content elements are being aggregated, then the license combinations may, but need not, involve three or more licenses per combination) and that the disclosed embodiments are merely exemplary. As previously discussed, license profiles 130 for one or more of licenses L1-L5 that provide license attribute information, including restriction, use, and/or interaction values for such attributes, may already exist in a repository 124 and/or can be generated using the license evaluation software process 134.

Upon identifying/generating the license profiles 130 for licenses L1-L5, the license aggregation software process 136 can compare, sequentially or in parallel, the attribute values of attributes associated with L1 with corresponding attribute values of attributes associated with L3 for license combination L1L3 and for each of the other combination pairs. As previously described, processing information associated with the license evaluation software process 134 and/or license aggregation software process 136 can be tracked and stored within one or more repositories and can include, for example, license profiles 130, event data 138-144 in one or more event data structures 146, aggregated license attributes and values (e.g., dominant values, subservient values, coexisting values, source values, license text excerpts, etc.). The processed and stored information can be used to identify aggregated license alternatives that are based on the various license combinations and can facilitate the selection of a preferred aggregated license for a particular operational/deployment environment. As the number of license aggregation operations performed by the disclosed technology increases, the performance of the collaboration architecture 100 may also increase since the data stored in the repositories 124 may already include the license profiles 130, aggregated license profiles 128, and/or other processing data that can facilitate the generation, evaluation, and/or selection of aggregated license alternatives.

The various software processes 126, 132, 134, 136, processing operations, repositories 124, content 106, 110, known license attributes 114, assigned attributes 112, attribute values 116-120, 148-152, license profiles 128, 130, entity types, event data structures 146 and associated event data 138-144, and/or other elements of the collaboration architecture 100 can operate on and/or otherwise be associated with one or more digital data processing devices (not shown) that may be interconnected by a network (not shown). Those skilled in the art will recognize that a digital data processing device can be a personal computer, computer workstation, laptop computer, server computer, mainframe computer, handheld device (e.g., personal digital assistant, Pocket PC, cellular telephone, etc.), information appliance, or any other type of generic or special-purpose, processor-controlled device capable of receiving, processing, and/or transmitting digital data. A processor refers to the logic circuitry that responds to and processes instructions that drive digital data processing devices and can include, without limitation, a central processing unit, an arithmetic logic unit, an application specific integrated circuit, a task engine, and/or any combinations, arrangements, or multiples thereof.

The instructions executed by a processor represent, at a low level, a sequence of "0's" and "1's" that describe one or more physical operations of a digital data processing device. These instructions can be pre-loaded into a programmable memory (not shown) (e.g., EEPROM) that is accessible to the processor and/or can be dynamically loaded into/from one or more volatile (e.g., RAM, cache, etc.) and/or non-volatile (e.g., hard drive, etc.) memory elements communicatively coupled to the processor. The instructions can, for example, correspond to the initialization of hardware within a digital data processing device, an operating system that enables the hardware elements to communicate under software control and enables other computer programs to communicate, and/or software application programs/software processes that are designed to perform particular functions for an entity or other computer programs, such as functions relating to processing requests from participants in a collaboration architecture.

A local user can interact with a digital data processing device by, for example, viewing a command line, graphical, and/or other user interface and entering commands via an input device, such as a mouse, keyboard, touch sensitive screen, track ball, keypad, etc. The user interface can be generated by a graphics subsystem of a digital data processing device, which renders the interface into an on or off-screen surface (e.g., in a video memory and/or on a display screen). Inputs from the user can be received via an input/output subsystem and routed to a processor via an internal bus (e.g., system bus) for execution under the control of the operating system.

Similarly, a remote user can interact with a digital data processing device over a data communications network. The inputs from the remote user can be received and processed in whole or in part by a remote digital data processing device collocated with the remote user. Alternatively or in combination, the inputs can be transmitted back to and processed by the local digital data processing device or to another digital data processing device via one or more networks using, for example, thin client technology. The user interface of the local digital data processing device can also be reproduced, in whole or in part, at the remote digital data processing device collocated with the remote user by transmitting graphics information to the remote device and instructing the graphics subsystem of the remote device to render and display at least part of the interface to the remote user. Network communications between two or more digital data processing devices typically require a network subsystem (e.g., as embodied in a network interface card) to establish the communications link between the devices. The communications link interconnecting digital data processing devices can include elements of a data communications network, a point to point connection, a bus, and/or any other type of digital data path capable of conveying processor-readable data.

A data communications network (e.g., Internet, intranets, etc.) can comprise a series of network nodes that can be interconnected by network devices and communication lines (e.g., public carrier lines, private lines, satellite lines, etc.) that enable the network nodes to communicate. The transfer of data (e.g., messages) between network nodes can be facilitated by network devices, such as routers, switches, multiplexers, bridges, gateways, etc., that can manipulate and/or route data from a source node to a destination node regardless of any dissimilarities in the network topology (e.g., bus, star, token ring), spatial distance (local, metropolitan, or wide area network), transmission technology (e.g., TCP/IP, Systems Network Architecture), data type (e.g., data, voice, video, or multimedia), nature of connection (e.g., switched, non-switched, dial-up, dedicated, or virtual), and/or physical link (e.g., optical fiber, coaxial cable, twisted pair, wireless, etc.) between the source and destination network nodes.

Although the disclosed technology has been described with reference to specific embodiments, it is not intended that such details should be regarded as limitations upon the scope of the invention, except as and to the extent that they are included in the accompanying claims.

What is claimed is:

1. A method comprising:

identifying, by a processor, a first license associated with a first protectable content;

associating, by a processor, a portion of a plurality of license attributes with the first license;

assigning, by a processor, a restriction value to each of the associated license attributes, the restriction values of the associated license attributes specifying particular restrictions pertaining to the first protectable content;

assigning, by a processor, at least one use value and at least one interaction value to a portion of the associated license attributes, the at least one use value representing a degree of distribution of the first protectable content and the at least one interaction value representing a degree of manipulation of the first protectable content;

comparing, by a processor, the assigned restriction, use, and interaction values of the at least some of the associated license attributes with corresponding attribute values associated with a second license, the second license being associated with a second protectable content;

detecting, by a processor, whether an event occurred associated with the comparison, wherein the event is at least one of an incompatibility, an error, and a warning;

responsive to the comparison and the event detection, determining, by a processor, license attributes associated with a third protectable content, the third protectable content comprising a portion of the first protectable content and a portion of the second protectable content; and storing in a computer readable memory the determined license attributes associated with the third protectable content;

wherein each processor is implemented in a digital data processing device.

2. The method of claim 1, wherein the first protectable content and the second protectable content correspond to different software elements.

3. The method of claim 2, wherein the software elements are compliant with an open source definition.

4. The method of claim 2, wherein the first protectable content is compliant with an open source definition and the second protectable content is not compliant with the open source definition.

5. The method of claim 1, wherein the first protectable content corresponds to at least one of a multimedia presentation, a video segment, an audio segment, a textual representation, a work of art, a visual representation, a technological know-how, a business know-how, and a contract right.

6. The method of claim 1, wherein the license attributes associated with the first license correspond to at least one of a software code format, a software naming convention, a software code annotation, a warranty, a reverse-engineering activity, a patent litigation activity, a standards body, a violation of intellectual property rights, and a textual description of at least one aspect of the first license.

7. The method of claim 1, wherein the assigned restriction values correspond to at least one of a prohibition, a requirement, and a nullity.

8. The method of claim 1, wherein the assigned restriction values are set to at least one of true, false, required, don't care, forbidden, 1, 0, −1, and text.

9. The method of claim 1, wherein the assigned use values correspond to at least one of an acquisition, a personal use, a research use, an organizational use, a limited distribution, and an unlimited distribution of at least one aspect of the first protectable content.

10. The method of claim 1, wherein the assigned interaction values correspond to at least one of an original element, a modified element, a group of distinct elements, a group of interconnected elements, a group of elements capable of providing a desired functionality, a plurality of interoperable groups of elements capable of providing a plurality of functions, an unrestricted manipulation of elements, and an unrestricted ownership of elements of at least one aspect of the first protectable content.

11. The method of claim 1, further comprising:
analyzing, by a processor, the first protectable content to identify the first license.

12. The method of claim 1, further comprising:
storing, by a processor, the restriction values, use values, and interaction values assigned to the at least some of the associated license attributes of the first license;
storing, by a processor, the corresponding attribute values associated with the second license;
based on the comparison of values, identifying, by a processor, values associated with the attributes associated with the third protectable content, the third protectable content being associated with a third license;
storing, by a processor, the identified values associated with the attributes of the third protectable content; and
using the stored attribute values of at least one of the first license, second license, and third license to determine, by a processor, attributes of a fourth protectable content, the fourth protectable content being based on a combination including at least some aspects of at least one of the first protectable content, second protectable content, and third protectable content.

13. The method of claim 1, further comprising:
storing, by a processor, the restriction values, use values, and interaction values assigned to the at least some of the associated license attributes of the first license;
storing, by a processor, the corresponding attribute values associated with the second license;
based on the comparison of values, identifying, by a processor, values associated with the attributes associated with the third protectable content, the third protectable content being associated with a third license;
storing, by a processor, the identified values associated with the attributes of the third protectable content; and
using the stored attribute values associated with the third protectable content to determine, by a processor, attribute values of a fourth protectable content, the fourth protectable content being based on a combination including at least some aspects of the third protectable content.

14. The method of claim 13, further comprising:
based on the attribute values of the fourth protectable content, determining, by a processor, a plurality of license alternatives for the fourth protectable content.

15. The method of claim 14, further comprising:
selecting, by a processor, one of the plurality of license alternatives based on an operational environment associated with the fourth protectable content.

16. The method of claim 14, further comprising:
storing, by a processor, the plurality of license alternatives in a network-accessible location.

17. The method of claim 1, further comprising:
providing a third license representative of the attributes associated with the third protectable content.

18. The method of claim 1, further comprising:
based on the attributes associated with the third protectable content, determining, by a processor, a plurality of license alternatives for the third protectable content.

19. The method of claim 18, further comprising:
selecting, by a processor, one of the plurality of license alternatives based on an operational environment associated with the third protectable content.

20. The method of claim 18, further comprising:
storing, by a processor, the plurality of license alternatives in a network-accessible location.

21. The method of claim 1, wherein the at least one assigned use value is equivalent to a default use value associated with the first license.

22. The method of claim 1, wherein the at least one assigned use value overrides a default use value associated with the first license.

23. The method of claim 1, wherein the at least one assigned interaction value is equivalent to a default interaction value associated with the first license.

24. The method of claim 1, wherein the at least one assigned interaction value overrides a default interaction value associated with the first license.

25. The method of claim 1, wherein the assigned restriction, use, and interaction values of the at least some of the associated license attributes of the first license override at least some of the corresponding attribute values associated with the second license to form attribute values associated with the third protectable content.

26. The method of claim 1, wherein the assigned restriction, use, and interaction values of the at least some of the associated license attributes of the first license coexist along with at least some of the corresponding attribute values associated with the second license as at least some attribute values of the attributes associated with the third protectable content.

27. The method of claim 1, further comprising:
generating, by a processor, information associated with the detected event, the event information including indicia pertaining to at least one of an event type, a frequency of occurrence of the event type, a related use value, a related interaction value, and an identifier associated with at least one of the first license and second license; and
storing, by a processor, the event information in a data structure.

28. The method of claim 1, further comprising assigning, by a processor, at least one source value to each of the attributes associated with the third protectable content, the source values identifying attribute information associated with at least one of the first and second licenses that affected values associated with particular ones of the attributes of the third protectable content.

* * * * *